United States Patent
Yu (10) Patent No.: US 10,784,786 B2
(45) Date of Patent: Sep. 22, 2020

(54) PSFB CONVERTER AND METHODS FOR CONTROLLING A PSFB CONVERTER

(71) Applicant: HUAWEI TECHNOLOGIES CO., LTD., Shenzhen, Guangdong (CN)

(72) Inventor: Juzheng Yu, Suzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/426,962

(22) Filed: May 30, 2019

(65) Prior Publication Data

US 2019/0372468 A1    Dec. 5, 2019

(30) Foreign Application Priority Data

May 31, 2018   (CN) .......................... 2018 1 0547340

(51) Int. Cl.
*H02M 3/335* (2006.01)
*H02M 1/42* (2007.01)
(Continued)

(52) U.S. Cl.
CPC ..... *H02M 3/33515* (2013.01); *H02M 1/4233* (2013.01); *H02M 3/33569* (2013.01);
(Continued)

(58) Field of Classification Search
CPC ................ H02M 2007/53878; H02M 3/33569
See application file for complete search history.

(56) References Cited

U.S. PATENT DOCUMENTS

2008/0298087 A1* 12/2008 Mozipo ............. H02M 3/33569
363/17
2014/0092634 A1    4/2014  Yan et al.
(Continued)

FOREIGN PATENT DOCUMENTS

CN    101386099 A    3/2009
CN    103595274 A    2/2014
(Continued)

OTHER PUBLICATIONS

Anonymous, "Stealing master notes, finally understand the analysis and calculation of the phase shift full bridge!", Retrevied from website:http://www.360doc.com/content/17/0110/19/9272174_621594077.shtml,dated ,total 30 pages.
(Continued)

*Primary Examiner* — Harry R Behm
(74) *Attorney, Agent, or Firm* — Womble Bond Dickinson (US) LLP (57) ABSTRACT

A method for controlling a PSFB converter, an apparatus, and a storage medium are disclosed, and relate to the field of power supply technologies. The method includes: controlling, by a control circuit after controlling a first clock and a second clock to operate in a first state for a time period, the first clock and the second clock to switch to a second state, where when the first clock and the second clock operate in the first state, the first bridge arm is a leading bridge arm, and the second bridge arm is a lagging bridge arm, and when the first clock and the second clock operate in the second state, the first bridge arm is a lagging bridge arm, and the second bridge arm is a leading bridge arm.

16 Claims, 5 Drawing Sheets

(51) Int. Cl.
*H02M 1/00* (2006.01)
*H02M 7/5387* (2007.01)

(52) U.S. Cl.
CPC .............. *H02M 2001/0006* (2013.01); *H02M 2001/0054* (2013.01); *H02M 2007/53878* (2013.01)

(56) References Cited

U.S. PATENT DOCUMENTS

2014/0146573 A1* 5/2014 Yan ..................... H02M 3/3376
363/17
2014/0177281 A1* 6/2014 Lai ..................... H02M 3/3353
363/17

FOREIGN PATENT DOCUMENTS

CN          106849652 A     6/2017
EP           1679783 A2     7/2006

OTHER PUBLICATIONS

Qi Lee, "Investigation on PWM Full Bridge Soft-switching Converter",dated Feb. 2006,total 54 pages.

* cited by examiner

PSFB CONVERTER AND METHODS FOR CONTROLLING A PSFB CONVERTER

CROSS-REFERENCE TO RELATED APPLICATION

This application claims priority to Chinese Patent Application No. 201810547340.4, filed on May 31, 2018, which is hereby incorporated by reference in its entirety.

TECHNICAL FIELD

This application relates to the field of power supply technologies, and in particular, to a phase-shifted full bridge (PSFB) converter control method and a PSFB converter.

BACKGROUND

A PSFB converter is capable of converting direct current into direct current of different voltages (for example, direct current of a lower voltage). Reliability of the PSFB converter needs to be improved.

SUMMARY

This application provides a method for controlling a PSFB converter and a PSFB converter, to improve reliability of the PSFB converter. The technical solutions are as follows.

According to a first aspect, a method for controlling a PSFB converter is provided, where the method includes: controlling, by a control circuit, a first clock and a second clock to operate in a first state, and controlling a timer to start timing, where the PSFB converter includes a first bridge arm and a second bridge arm, the first bridge arm includes a first metal oxide semiconductor field effect transistor (MOSFET) and a second MOSFET, the second bridge arm includes a third MOSFET and a fourth MOSFET, a first drive signal output by the control circuit based on the first clock is input to a gate of the first MOSFET, a second drive signal output by the control circuit based on the first clock is input to a gate of the second MOSFET, a third drive signal output by the control circuit based on the second clock is input to a gate of the third MOSFET, a fourth drive signal output by the control circuit based on the second clock is input to a gate of the fourth MOSFET, the first drive signal, the second drive signal, the third drive signal, and the fourth drive signal are all periodic signals, frequencies of the first drive signal, the second drive signal, the third drive signal, and the fourth drive signal are the same and are drive frequencies, the first drive signal and the second drive signal are complementary to each other, the third drive signal and the fourth drive signal are complementary to each other, and when the first clock and the second clock operate in the first state, the first bridge arm is a leading bridge arm, and the second bridge arm is a lagging bridge arm; and controlling, by the control circuit when timing duration of the timer reaches a first threshold, the first clock and the second clock to switch to a second state, where when the first clock and the second clock operate in the second state, the first bridge arm is the lagging bridge arm, and the second bridge arm is the leading bridge arm.

If the two bridge arms of the PSFB converter do not have a same lifespan, a lifespan of the PSFB converter depends on a bridge arm with a shorter lifespan of the two bridge arms. As a result, the PSFB converter has relatively low reliability. A lifespan of a bridge arm is related to a loss of the bridge arm. In the PSFB converter, a conduction loss and a turn-on loss of each of the four MOSFETs approximate to 0, and therefore a loss of each MOSFET is basically a turn-off loss of the MOSFET. Accordingly, a loss of each bridge arm also approximates to a sum of turn-off losses of two MOSFETs of the bridge arm. Therefore, a relatively large difference between two turn-off losses of two bridge arms affects reliability of the PSFB converter. In a working process of the PSFB converter, a turn-off loss of the leading bridge arm is greater than a turn-off loss of the lagging bridge arm. Therefore, in this application, the control circuit switches roles of the leading bridge arm and the lagging bridge arm after a working time reaches a threshold. Therefore, according to the control method provided in this application, the first bridge arm can act as the leading bridge arm in one time period and act as the lagging bridge arm in another time period, and similarly, the second bridge arm can act as the lagging bridge arm in one time period and act as the leading bridge arm in another time period, so that a turn-off loss of the first bridge arm and a turn-off loss of the second bridge arm become almost the same, thereby improving reliability of the PSFB converter.

The first bridge arm and the second bridge arm form a quadrilateral, the first MOSFET is at a first corner of the quadrilateral, the second MOSFET is at a second corner of the quadrilateral, the third MOSFET is at a third corner of the quadrilateral, the fourth MOSFET is at a fourth corner of the quadrilateral, the first corner and the third corner are opposite to each other, and the second corner and the fourth corner are opposite to each other.

In one embodiment, the controlling, by the control circuit, the first clock and the second clock to switch to a second state includes: setting a phase difference between the first drive signal and the third drive signal to an opposite number of a before-switching phase difference, where the before-switching phase difference is a phase difference between the first drive signal and the third drive signal when the first clock and the second clock operate in the first state.

In this application, the control circuit may control, by changing the phase difference between the first drive signal and the third drive signal, the first clock and the second clock to switch to the second state. The phase difference between the first drive signal and the third drive signal is the before-switching phase difference when the first clock and the second clock operate in the first state. If the phase difference between the first drive signal and the third drive signal is set to the opposite number of the before-switching phase difference, the first clock and the second clock can be switched to the second state.

In one embodiment, setting a phase difference between the first drive signal and the third drive signal to an opposite number of a before-switching phase difference includes: gradually changing the phase difference between the first drive signal and the third drive signal until the phase difference between the first drive signal and the third drive signal is the opposite number of the before-switching phase difference.

In this application, to avoid an abnormality of the PSFB converter caused by an abrupt change in the phase difference between the first drive signal and the third drive signal, the phase difference between the first drive signal and the third drive signal may be gradually changed when the phase difference between the first drive signal and the third drive signal is set to the opposite number of the before-switching phase difference.

In one embodiment, the method further includes: gradually changing the drive frequency in a process of gradually changing the phase difference between the first drive signal and the third drive signal, so that a product of the phase difference and the drive frequency falls within a target range.

When a voltage of an input power supply connected to the PSFB converter is fixed, voltages applied to two ends of a load by the PSFB converter are related to a duty cycle. The duty cycle is a product of the drive frequency and the phase difference between the first drive signal and the third drive signal. Therefore, in the process of changing the phase difference between the first drive signal and the third drive signal, the drive frequency is correspondingly adjusted to avoid a sharp change in the voltages at the two ends of the load.

In one embodiment, the method further includes: controlling, by the control circuit when the control circuit controls the first clock and the second clock to switch to the second state, the timer to restart timing; and controlling, by the control circuit when new timing duration of the timer reaches a second threshold, the first clock and the second clock to switch to the first state.

In this application, the first clock and the second clock cycle can be controlled to alternately operate in the first state and the second state, so as to improve reliability of the PSFB converter.

According to a second aspect, a PSFB converter is provided, where the PSFB converter includes a first bridge arm, a second bridge arm, a power output circuit, and a control circuit.

The first bridge arm and the second bridge arm are connected in parallel, the first bridge arm includes a first MOSFET and a second MOSFET, the second bridge arm includes a third MOSFET and a fourth MOSFET, a first input end of the power output circuit is connected to a bridge arm midpoint of the first bridge arm, and a second input end of the power output circuit is connected to a bridge arm midpoint of the second bridge arm.

The control circuit includes a first clock, a second clock, and a timer, a first drive signal output by the control circuit based on the first clock is input to a gate of the first MOSFET, a second drive signal output by the control circuit based on the first clock is input to a gate of the second MOSFET, a third drive signal output by the control circuit based on the second clock is input to a gate of the third MOSFET, a fourth drive signal output by the control circuit based on the second clock is input to a gate of the fourth MOSFET, the first drive signal, the second drive signal, the third drive signal, and the fourth drive signal are all periodic signals, frequencies of the first drive signal, the second drive signal, the third drive signal, and the fourth drive signal are the same and are drive frequencies, the first drive signal and the second drive signal are complementary to each other, and the third drive signal and the fourth drive signal are complementary to each other.

The control circuit provides a function of implementing the method for controlling a PSFB converter in the first aspect.

DESCRIPTION OF EMBODIMENTS

To make the objectives, technical solutions, and advantages of this application clearer, the following further describes the implementations of this application in detail with reference to the accompanying drawings.

Figure 1:
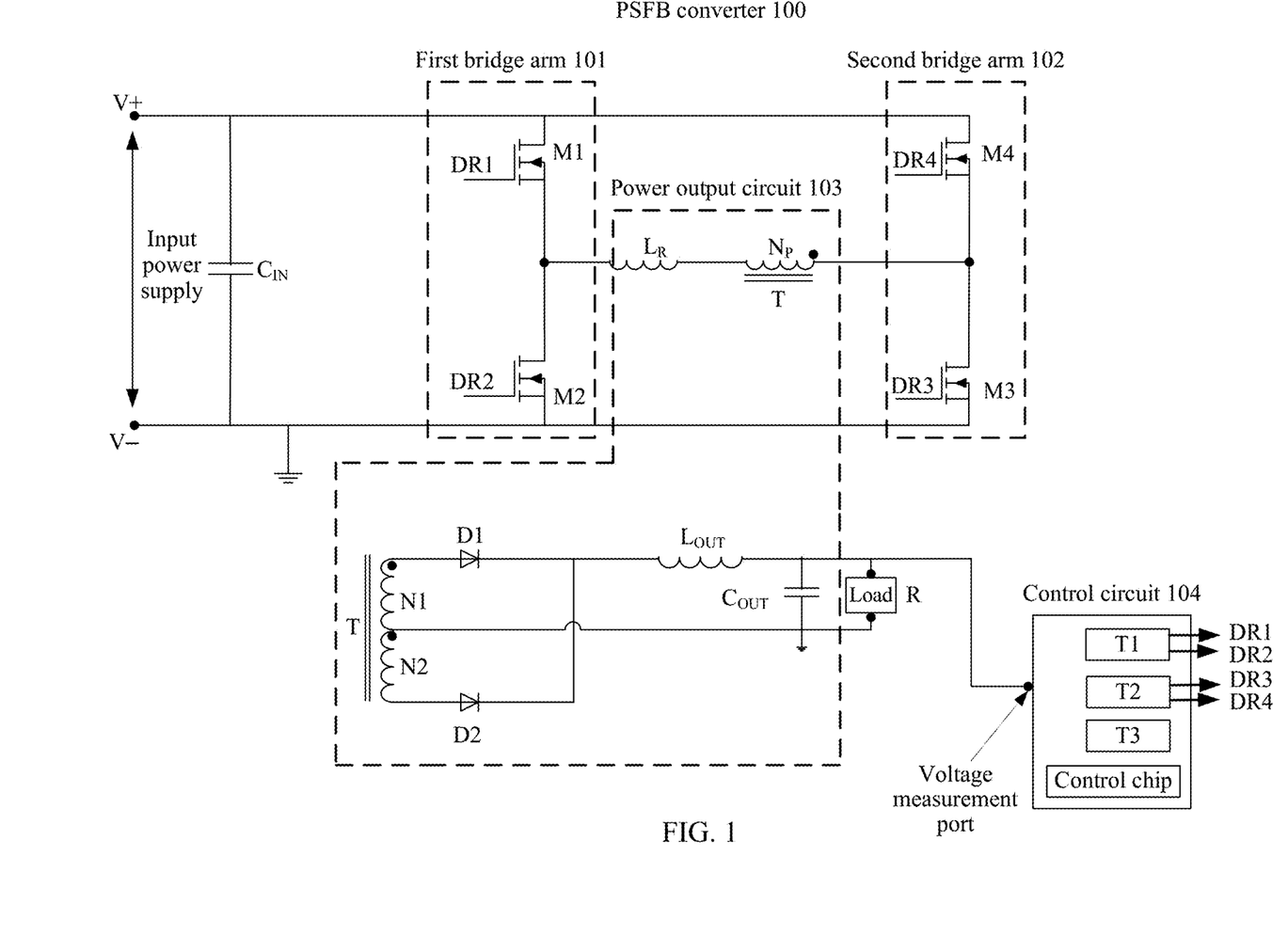
FIG. 1 is a schematic structural diagram of a PSFB converter according to an embodiment of this application.

FIG. 1 is a schematic structural diagram of a PSFB converter according to an embodiment of this application. As shown in FIG. 1, a PSFB converter 100 includes a first bridge arm 101, a second bridge arm 102, a power output circuit 103, and a control circuit 104.

As shown in FIG. 1, the PSFB converter 100 has positive and negative power input ports: a positive power input port V+ and a negative power input port V−. An input power supply may be connected to the PSFB converter by using the positive and negative power input ports, to transfer energy to a load by using the PSFB converter. The first bridge arm 101 and the second bridge arm 102 are connected in parallel to the positive and negative power input ports of the PSFB converter 100. The first bridge arm 101 includes a first MOSFET M1 and a second MOSFET M2, and the second bridge arm 102 includes a third MOSFET M3 and a fourth MOSFET M4.

That the first bridge arm 101 is connected in parallel to the positive and negative power input ports of the PSFB converter 100 means that a drain of the first MOSFET M1 is connected to the positive power input port V+, and that a source of the first MOSFET M1 is connected to a drain of the second MOSFET M2. A source of the second MOSFET M2 is connected to the negative power input port V−. That the second bridge arm 102 is connected in parallel to the positive and negative power input ports of the PSFB converter 100 means that a drain of the fourth MOSFET M4 is connected to the positive power input port V+, and a source of the fourth MOSFET M4 is connected to a drain of the third MOSFET M3. A source of the third MOSFET M3 is connected to the negative power input port V−. The following can be learned from the connection relationships: the first bridge arm and the second bridge arm form a quadrilateral, the first MOSFET is at a first corner of the quadrilateral, the second MOSFET is at a second corner of the quadrilateral, the third MOSFET is at a third corner of the quadrilateral, the fourth MOSFET is at a fourth corner of the quadrilateral, the first corner and the third corner are opposite to each other, and the second corner and the fourth corner are opposite to each other. Sources and drains of one or more of the MOSFETs may be exchanged.

The control circuit 104 includes a first clock T1, a second clock T2, and a timer T3. The control circuit 104 outputs a first drive signal DR1 and a second drive signal DR2 based on the first clock T1, and outputs a third drive signal DR3 and a fourth drive signal DR4 based on the second clock T2. The first drive signal DR1 is input to a gate of the first MOSFET M1, the second drive signal DR2 is input to a gate of the second MOSFET M2, the third drive signal DR3 is input to a gate of the third MOSFET M3, and the fourth drive signal DR4 is input to a gate of the fourth MOSFET M4. In other words, the first drive signal DR1 output by the control circuit 104 based on the first clock is input to the gate of the first MOSFET M1, the second drive signal DR2 output by the control circuit 104 based on the first clock is input to the gate of the second MOSFET M2, the third drive signal DR3 output by the control circuit 104 based on the second clock is input to the gate of the third MOSFET M3, and the fourth drive signal DR4 output by the control circuit 104 based on the second clock is input to the gate of the fourth MOSFET M4.

The timer T3 is configured to perform timing. The control circuit 104 controls the first clock T1 and the second clock T2 by using the timer T3, to implement the method for controlling a PSFB converter provided in the embodiments of this application.

Signals that the control circuit 104 controls to generate based on the first clock and the second clock are digital signals. In this case, the control circuit 104 may further include two drive circuits: a first drive circuit and a second drive circuit. The first drive circuit is connected to the first clock, and is configured to convert a digital signal generated by the first clock into the first drive signal and the second drive signal. The second drive circuit is connected to the second clock, and is configured to convert a digital signal generated by the second clock into the third drive signal and the fourth drive signal.

In addition, the control circuit 104 further includes a control chip. The control chip may be an MCU, a field-programmable gate array (FPGA), a digital signal processor (DSP), or the like. The first drive circuit and the second drive circuit may be integrated into the control chip or may be disposed outside the control chip. This is not specifically limited in this embodiment of this application.

In addition, in this embodiment of this application, the control circuit 104 may be supplied with power through a plurality of techniques. For example, the control circuit 104 may also include an additional power supply, and the additional power supply is configured to supply power to the control circuit. For another example, the control circuit 104 is connected to the input power supply by using another converter, and the input power supply supplies power to the control circuit 104 by using the another converter. The another converter is a voltage converter different from the PSFB converter, and is configured to convert a voltage of the input power supply to a voltage required by the control circuit 104. For another example, when a voltage required by the load is almost the same as the voltage required by the control circuit 104, the control circuit 104 may also be directly connected to an output end of the PSFB converter, so that power is supplied to the control circuit 104 by using the output end of the PSFB converter.

In addition, the first drive circuit and the second drive circuit also need to be powered on. For specific power supply techniques, refer to the power supply techniques of the control circuit 104. Details are not repeated herein.

Figure 2:
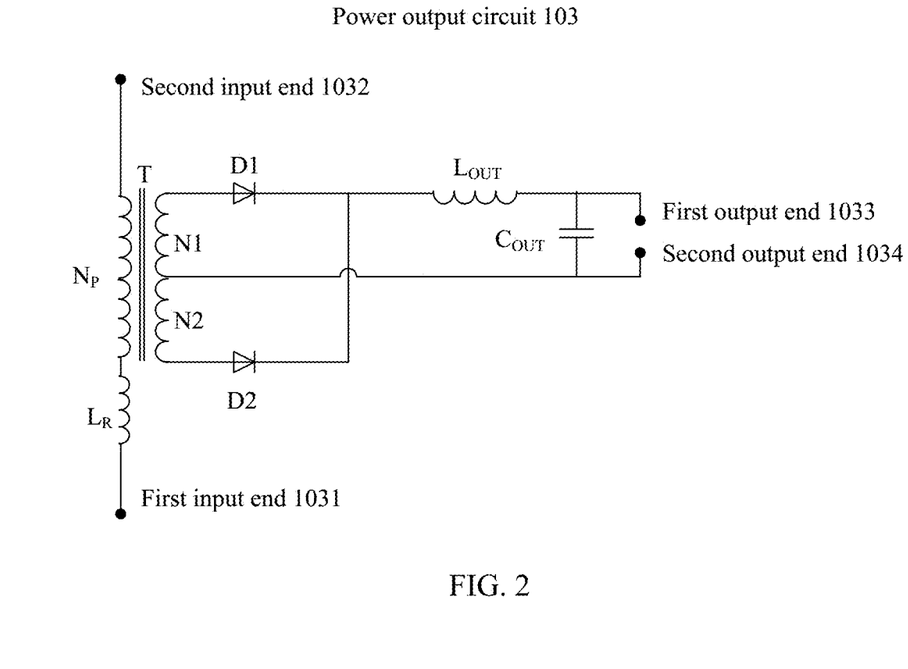
FIG. 2 is a schematic diagram of a power output circuit according to an embodiment of this application.

FIG. 2 is a schematic diagram of a power output circuit 103 according to an embodiment of this application. As shown in FIG. 2, the power output circuit 103 has two input ends: a first input end 1031 and a second input end 1032. The power output circuit 103 also has two output ends: a first output end 1033 and a second output end 1034. As shown in FIG. 1, the first input end 1031 is connected to a bridge arm midpoint of a first bridge arm 101, the second input end 1032 is connected to a bridge arm midpoint of a second bridge arm 102, and the first output end 1033 and the second output end 1034 are to two ends of a load R. The bridge arm midpoint refers to a junction between two MOSFETs of a corresponding bridge arm.

In one embodiment, as shown in FIG. 1 or FIG. 2, the power output circuit 103 includes a resonant inductor $L_R$, a transformer T, two diodes D1 and D2, an output inductor $L_{OUT}$, and an output capacitor $C_{OUT}$. The first input end 1031 of the power output circuit 103 is at one end of the resonant inductor $L_R$, the other end of the resonant inductor $L_R$ is connected to one end of a primary coil $N_P$ of the transformer T, and the second input end 1032 of the power output circuit 103 is at the other end of the primary coil $N_P$ of the transformer T. The transformer T has two secondary coils: a secondary coil N1 and a secondary coil N2. One end of the secondary coil N1 is connected to an anode of the diode D1, and a cathode of the diode D1 is connected to one end of the output inductor $L_{OUT}$. The other end of the secondary coil N1 is connected to one end of the secondary coil N2, and the other end of the secondary coil N2 is connected to an anode of the diode D2. A cathode of the diode D2 is also connected to the one end of the output inductor $L_{OUT}$, the other end of the output inductor $L_{OUT}$ is connected to one end of the load R, and the other end of the load R is connected to the other end of the secondary coil N1. The output capacitor $C_{OUT}$ is connected to the load R in parallel. That the output capacitor $C_{OUT}$ is connected to the load R in parallel means that one end of the output capacitor $C_{OUT}$ is connected to the first output end 1033 of the power output circuit, and that the other end of the output capacitor $C_{OUT}$ is connected to the second output end 1034 of the power output circuit 103. The first output end 1033 of the power output circuit 103 is at the other end of the output inductor $L_{OUT}$, and the second output end 1034 of the power output circuit 103 is at the other end of the secondary coil N1 and the one end of the secondary coil N2. In addition, as shown in FIG. 1, the second output end 1034 of the power output circuit 103 is grounded.

In another embodiment, the power output circuit 103 shown in FIG. 1 or FIG. 2 may not include the resonant inductor $L_R$. In this case, the two input ends of the power output circuit 103 are at two ends of the primary coil of the transformer T. Other connection relationships are shown in FIG. 1 or FIG. 2. Details are not repeated herein.

In one embodiment, as shown in FIG. 1, the PSFB converter 100 may further include a filter capacitor C. The filter capacitor $C_{IN}$ is connected in parallel to the positive and negative power input ports of the PSFB converter, and is configured to perform filtering for the input power supply.

Optionally, when the PSFB converter is connected to the load R, as shown in FIG. 1, the control circuit 104 further includes a voltage measurement port. The voltage measurement port is connected to the one end of the load R, and the control circuit 104 may determine voltages at two ends of the load R based on the voltage measurement port.

For ease of description below, a working principle of the PSFB converter is first described herein.

In this embodiment of this application, all four drive signals are periodic signals, and frequencies of the four drive signals are the same. For ease of description, the frequencies of the four drive signals are referred to as drive frequencies. A first drive signal DR1 and a second drive signal DR2 are a pair of complementary drive signals. That the first drive signal DR1 and the second drive signal DR2 are complementary means that when the first drive signal DR1 is a high-level signal, the second drive signal DR2 is a low-level signal, and that when the second drive signal DR2 is a high-level signal, the first drive signal DR1 is a low-level signal. Similarly, a third drive signal DR3 and a fourth drive signal DR4 are a pair of complementary drive signals.

As shown in FIG. 1, when the first drive signal DR1 and the second drive signal DR2 each are a high-level signal, or when the third drive signal DR3 and the fourth drive signal DR4 each are a high-level signal, the input power supply is short-circuited. To avoid a short circuit, a dead time is set between the first drive signal DR1 and the second drive signal DR2, and the dead time is a time in which the first drive signal DR1 and the second drive signal DR2 each are of a low-level. Accordingly, a dead time is also set between the third drive signal DR3 and the fourth drive signal DR4. Usually, the dead time is very short, for example, 0.5 ms or 1 ms.

Figure 3:
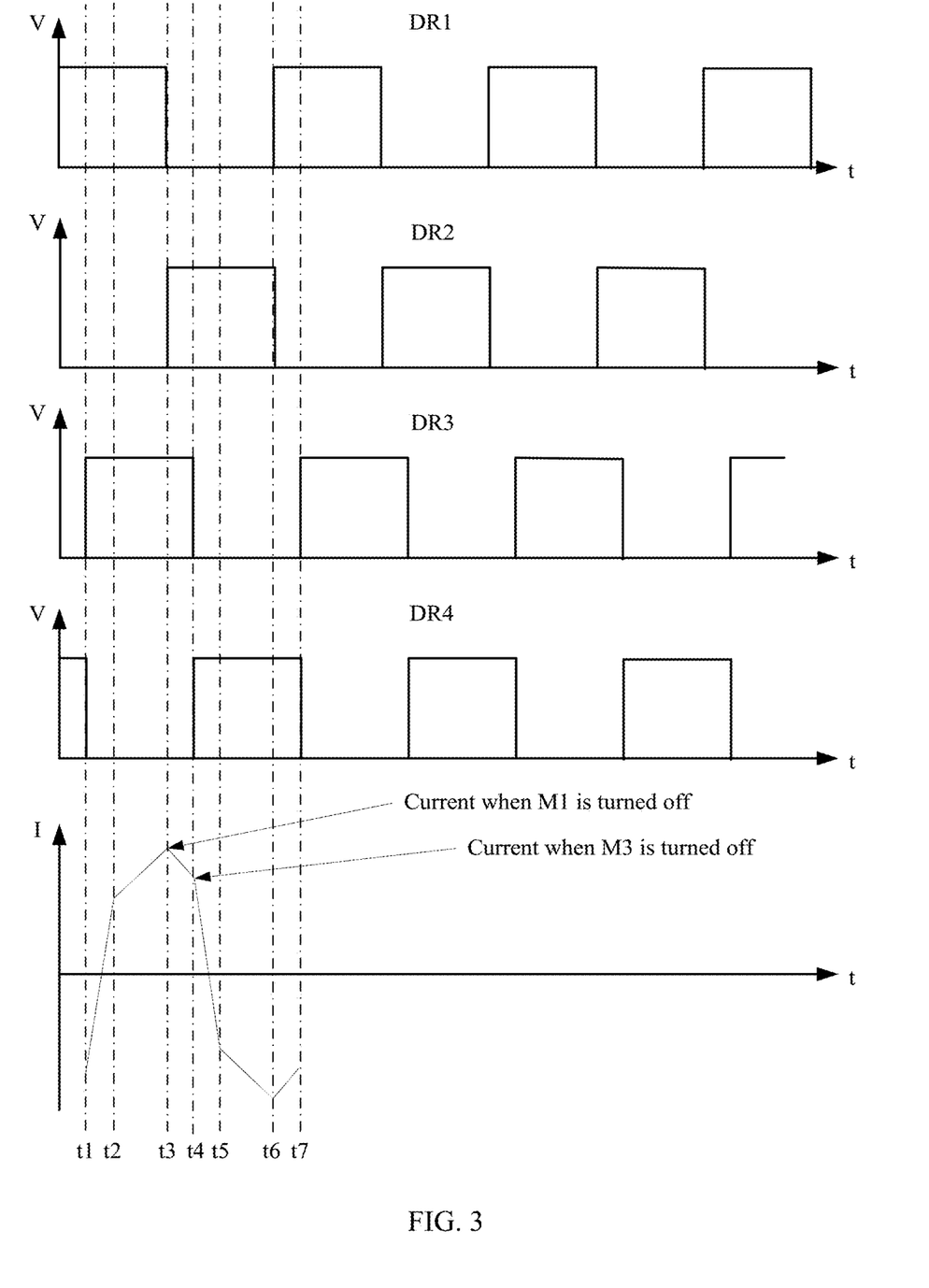
FIG. 3 is a timing diagram of a scenario of drive signals according to an embodiment of this application.

FIG. 3 is a timing diagram of a scenario of drive signals according to an embodiment of this application. As shown in FIG. 3, all four drive signals are periodic square wave signals. A first drive signal DR1 and a second drive signal DR2 are complementary to each other, and a third drive signal DR3 and a fourth drive signal DR4 are complementary to each other. A dead time is extremely short. Therefore, in FIG. 3, a dead time between the first drive signal DR1 and the second drive signal DR2 and a dead time between the third drive signal DR3 and the fourth drive signal Drive4 are not marked.

As shown in FIG. 3, a phase difference between the first drive signal DR1 and the third drive signal DR3 is a positive value, and a phase difference between the second drive signal DR2 and the fourth drive signal DR4 is also a positive value. That a phase difference between the first drive signal DR1 and the third drive signal DR3 is a positive value means that it takes some time to align a rising edge of the first drive signal DR1 with a rising edge of the third drive signal DR3. Because the first drive signal DR1 and the second drive signal DR2 are complementary to each other and the third drive signal DR3 and the fourth drive signal DR4 are complementary to each other, the phase difference between the first drive signal DR1 and the third drive signal DR3 is the same as the phase difference between the second drive signal DR2 and the fourth drive signal DR4.

Based on the drive signals shown in FIG. 3 and the structure of the PSFB converter shown in FIG. 1, as shown in FIG. 3, a working process of a PSFB converter may be divided into the following stages.

Stage (1) t1 to t3

At t1, the first drive signal DR1 and the third drive signal DR3 each are a high-level signal, a first MOSFET M1 and a third MOSFET M3 each are in a conducting state, and current passing through a primary coil $N_P$ becomes larger. At t2, a speed at which the current becomes larger slows down because of self-coupling of the primary coil $N_P$. At t3, the current passing through the primary coil $N_P$ becomes largest.

In this time period, the current passing through the primary coil $N_P$ keeps getting larger, and therefore current is generated in a secondary coil N1 and a secondary coil N2. There are dotted terminals between the primary coil $N_P$ of a transformer T and the two secondary coils (the dotted terminals between the primary coil $N_P$ and the two secondary coils are marked as black dots in FIG. 1), and the dotted terminals are ports of a same current direction. It can be learned that in the time period from t1 to t3, current passing from the secondary coil N1 to an anode of a diode D1 is forward current, and current passing from the secondary coil N2 to an anode of a diode D2 is backward current. Therefore, in the time period from t1 to t3, the diode D1 is turned on, the diode D2 is turned off, and the secondary coil N1, the diode D1, an output inductor $L_{OUT}$, and an output capacitor $C_{OUT}$ form a loop to supply energy to a load R.

Stage (2) t3 to t4

At t3, the first MOSFET M1 is turned off, and a second MOSFET M2 is turned on. At this time, the second MOSFET M2 and the third MOSFET M3 each are in a conducting state, and a resonant inductor $L_R$, the primary coil $N_P$, the second MOSFET M2, and the third MOSFET M3 form a circuit. Energy stored in the resonant inductor $L_R$ and the primary coil $N_P$ is discharged, and the current passing through the primary coil $N_P$ becomes smaller.

In this time period, the diode D1 is still turned on, the diode D2 is still turned off, and the secondary coil N1, the diode D1, the output inductor $L_{OUT}$, and the output capacitor $C_{OUT}$ form a loop to supply energy to the load R.

Stage (3) t4 to t6

At t4, the third MOSFET M3 is turned off, and a fourth MOSFET M4 is turned on. At this time, the second MOSFET M2 and the fourth MOSFET M4 each are in a conducting state, and power is supplied to the second MOSFET M2 and the fourth MOSFET M4 by using an input power supply. The current passing through the primary coil $N_P$ is increased negatively. At t5, a speed at which the current becomes larger slows down because of self-coupling of the primary coil N. At t6, the current passing through the primary coil $N_P$ is negatively increased to a largest value.

In this time period, the current passing from the secondary coil N1 to the anode of the diode D1 is backward current, and the current passing from the secondary coil N2 to the anode of the diode D2 is forward current. Therefore, in the time period from t4 to t6, the diode D1 is turned off, the diode D2 is turned on, and the secondary coil N2, the diode D2, the output inductor $L_{OUT}$, and the output capacitor $C_{OUT}$ form a loop to supply energy to the load R.

Stage (4) t6 to t7

At t6, the second MOSFET M2 is turned off, and the first MOSFET M1 is turned on. At this time, the first MOSFET M1 and the fourth MOSFET M4 each are in a conducting state. At this time, the resonant inductor $L_R$, the transformer T, the first MOSFET M1, and the fourth MOSFET M4 form a circuit. Energy stored in the resonant inductor $L_R$ and the transformer is discharged, and the current passing through the primary coil $N_P$ becomes smaller. At t7, a next cycle begins. In this time period, the secondary coil N2, the diode D2, the output inductor $L_{OUT}$, and the output capacitor $C_{OUT}$ form a loop to supply energy to the load R.

As shown in FIG. 3, before the first MOSFET M1 and the third MOSFET M3 each are in the conducting state, the first MOSFET M1 is already turned on, and before the second MOSFET M2 and the fourth MOSFET M4 each are in the conducting state, the second MOSFET M2 is also already turned on. Therefore, under the control of the four drive signals shown in FIG. 3, a first bridge arm is a leading bridge arm, and a second bridge arm is a lagging bridge arm. In this embodiment of this application, if four drive signals output by a first clock T1 and a second clock T2 are the drive signals shown in FIG. 3, it is considered that the first clock T1 and the second clock T2 operate in a first state.

As shown in FIG. 3, the current at the moment t3 is greater than the current at the moment t4. Therefore, a turn-off loss of the first MOSFET M1 is greater than a turn-off loss of the third MOSFET M3, and similarly, a turn-off loss of the second MOSFET M2 is also greater than a turn-off loss of the fourth MOSFET M4. If the PSFB converter keeps operating under the drive signals shown in FIG. 3, in other words, if a controller keeps controlling the first clock and the second clock to operate in the first state, a turn-off loss of the first bridge arm is greater than a turn-off loss of the second bridge arm in a quite long time period, resulting in low reliability of the PSFB converter. Therefore, an embodiment of this application provides a method for controlling a PSFB converter, to improve reliability of the PSFB converter.

Figure 4:
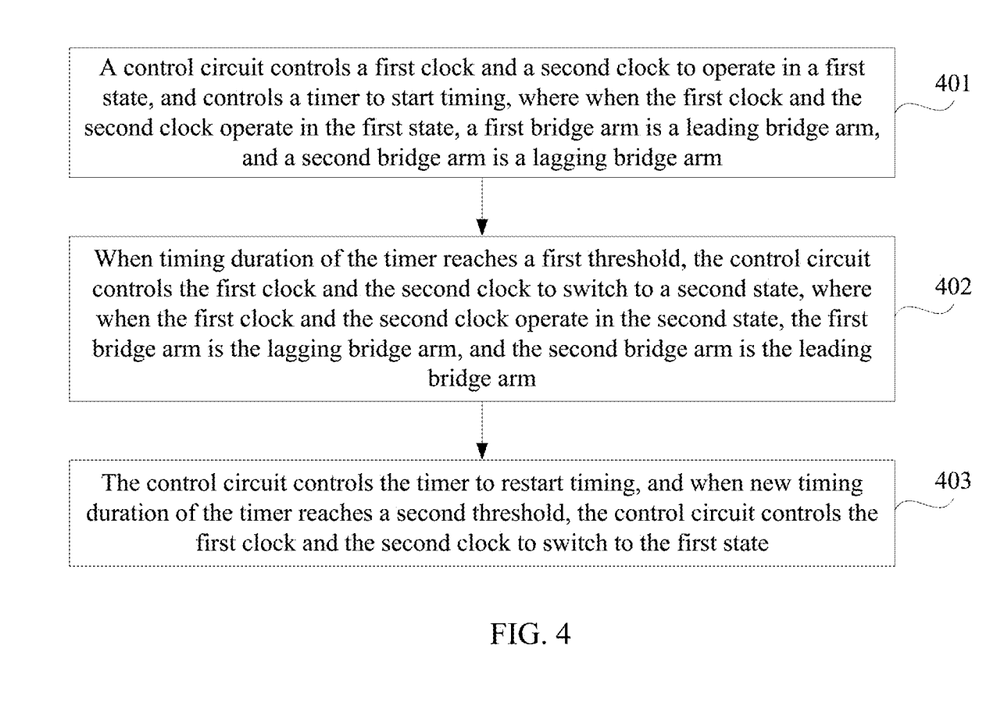
FIG. 4 is a flowchart of a method for controlling a PSFB converter according to an embodiment of this application.

FIG. 4 is a flowchart of a method for controlling a PSFB converter according to an embodiment of this application.

The method is applied to the PSFB converter. As shown in FIG. 4, the method includes the following operations.

Operation 401: A control circuit controls a first clock and a second clock to operate in a first state, and controls a timer to start timing, where when the first clock and the second clock operate in the first state, a first bridge arm is a leading bridge arm, and a second bridge arm is a lagging bridge arm.

That the control circuit controls a first clock and a second clock to operate in a first state has been described in detail in the foregoing descriptions of the structure of the PSFB converter. Details are not repeated herein.

In this embodiment of this application, to prevent the first bridge arm from always acting as the leading bridge arm and prevent the second bridge arm from always acting as the lagging bridge arm, when the control circuit controls the first clock and the second clock to operate in the first state, the control circuit also needs to control the timer to start timing, so as to switch between the leading bridge arm and the lagging bridge arm after the first clock and the second clock operate in the first state for a time period, and to improve reliability of the PSFB converter.

Operation 402: When timing duration of the timer reaches a first threshold, the control circuit controls the first clock and the second clock to switch to a second state, where when the first clock and the second clock operate in the second state, the first bridge arm is the lagging bridge arm, and the second bridge arm is the leading bridge arm.

That the control circuit controls the first clock and the second clock to switch to a second state means that the control circuit re-outputs a first drive signal and a second drive signal based on the first clock and re-outputs a third drive signal and a fourth drive signal based on the second clock. In this case, a phase difference between the first drive signal and the third drive signal is a negative value, and a phase difference between the second drive signal and the fourth drive signal is also a negative value. In this case, when the four drive signals are input to gates of four MOSFETs respectively in the manner shown in FIG. 1, the first bridge arm is the lagging bridge arm, and the second bridge arm is the leading bridge arm.

In this embodiment of this application, the phase difference between the first drive signal and the third drive signal is the same as the phase difference between the second drive signal and the fourth drive signal. Therefore, adjusting the phase difference between the first drive signal and the third drive signal is adjusting the phase difference between the second drive signal and the fourth drive signal. Therefore, in one embodiment, operation 402 may be specifically: setting the phase difference between the first drive signal and the third drive signal to an opposite number of a before-switching phase difference, where the before-switching phase difference is a phase difference between the first drive signal and the third drive signal when the first clock and the second clock operate in the first state.

Figure 5:
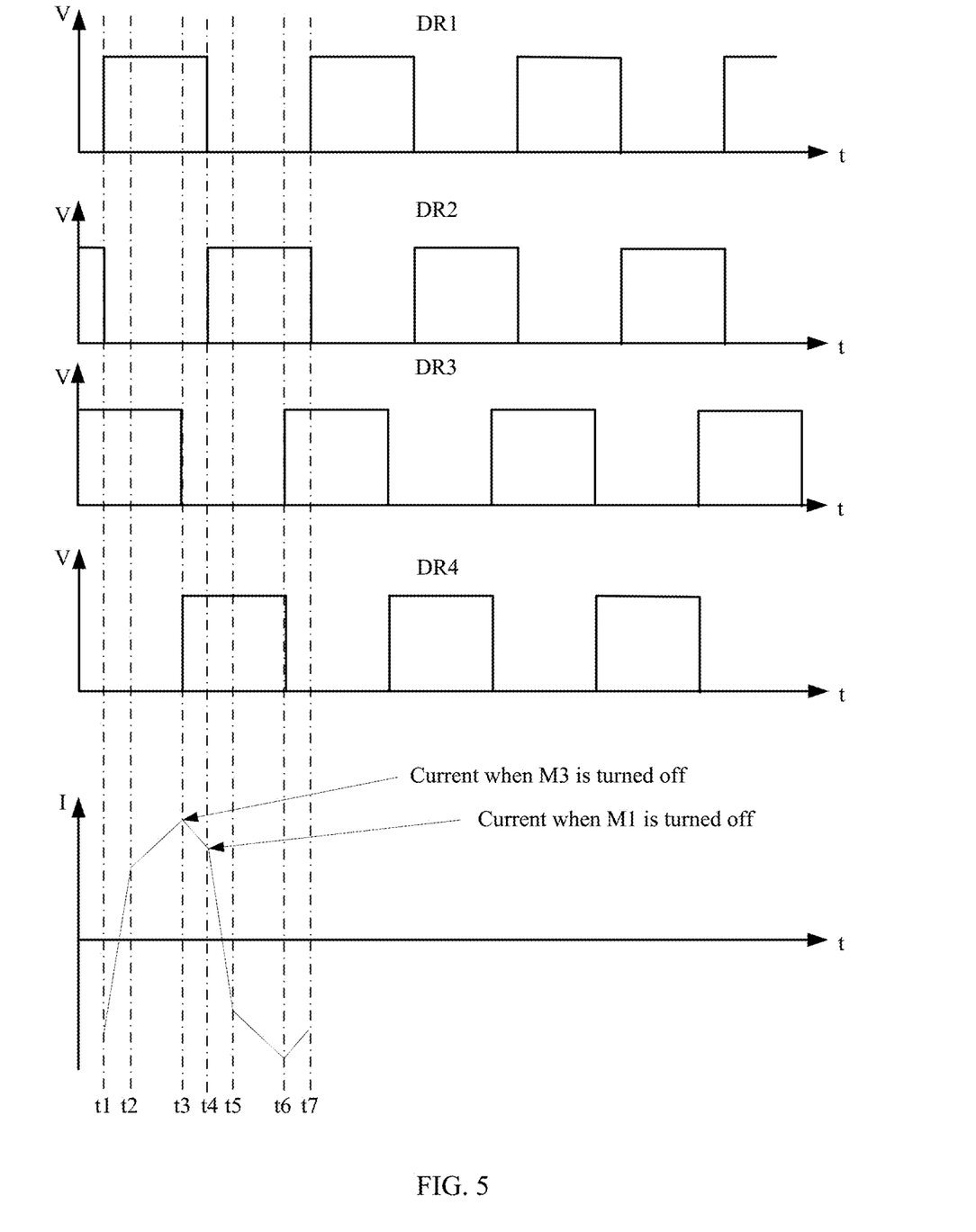
FIG. 5 is a timing diagram of another scenario of drive signals according to an embodiment of this application.

FIG. 5 is a timing diagram of another scenario of drive signals according to an embodiment of this application. As shown in FIG. 5, a phase difference between a first drive signal and a third drive signal is a negative value, and a phase difference between a second drive signal and a fourth drive signal is also a negative value. That a phase difference between a first drive signal and a third drive signal is a negative value means that it takes some time to align a rising edge of the third drive signal with a rising edge of the first drive signal. That a phase difference between a second drive signal and a fourth drive signal is a negative value means that it also takes some time to align a rising edge of the fourth drive signal with a rising edge of the second drive signal.

In the drive signals shown in FIG. 5, at t1, the first drive signal and the third drive signal each are a high-level signal, the first MOSFET M1 and the third MOSFET M3 each are in a conducting state, and current passing through a primary coil $N_P$ becomes larger. At t2, a speed at which the current becomes larger slows down because of self-coupling of the primary coil $N_P$. At t3, the third MOSFET M3 is turned off, the fourth MOSFET M4 is turned on, the first MOSFET M1 and the fourth MOSFET M4 each are in a conducting state, a resonant inductor $L_R$, a transformer T, the first MOSFET M1, and the fourth MOSFET M4 form a loop, energy stored in the resonant inductor $L_R$ and the transformer T is discharged, and the current passing through the primary coil $N_P$ becomes smaller. At t4, the first MOSFET M1 is turned off, the second MOSFET M2 is turned on, the second MOSFET M2 and the fourth MOSFET M4 each are in a conducting state, and power is supplied to the second MOSFET M2 and the fourth MOSFET M4 by using an input power supply $V_{IN}$. The current passing through the primary coil $N_P$ is increased negatively. At t5, the speed at which the current becomes larger slows down because of self-coupling of the primary coil N. At t6, the fourth MOSFET M4 is turned off, the third MOSFET M3 is turned on, the second MOSFET M2 and the third MOSFET M3 each are in a conducting state, the resonant inductor $L_R$, the transformer T, the second MOSFET M2, and the third MOSFET M3 form a loop, the energy stored in the resonant inductor $L_R$ and the transformer T is discharged, and the current passing through the primary coil $N_P$ becomes smaller. At t7, a next cycle begins. As shown in FIG. 5, before the first MOSFET M1 and the third MOSFET M3 each are in the conducting state, the third MOSFET M3 is already turned on, and before the second MOSFET M2 and the fourth MOSFET M4 each are in the conducting state, the fourth MOSFET M4 is also already turned on. Therefore, based on the drive signals shown in FIG. 5, the first bridge arm is the lagging bridge arm, and the second bridge arm becomes the leading bridge arm.

Further, to avoid an abnormality of the PSFB converter caused by an abrupt change in the phase difference between the first drive signal and the third drive signal, when the phase difference between the first drive signal and the third drive signal is set to an opposite number of a before-switching phase difference, the phase difference between the first drive signal and the third drive signal may be gradually changed until the phase difference between the first drive signal and the third drive signal is the opposite number of the before-switching phase difference.

In one embodiment, the phase difference between the first drive signal and the third drive signal may be gradually decreased. When the phase difference between the first drive signal and the third drive signal is 0, the phase difference between the first drive signal and the third drive signal is continuously decreased, until an absolute value of the phase difference between the first drive signal and the third drive signal is equal to the before-switching phase difference.

One embodiment of gradually decreasing the phase difference between the first drive signal and the third drive signal may be: determining whether a current phase difference between the first drive signal and the third drive signal is 0 at each rising edge of the first drive signal. If the current phase difference between the first drive signal and the third drive signal is not 0, a change amount is subtracted from the current phase difference between the first drive signal and the third drive signal, and a phase difference obtained through subtracting the change amount is used as the current phase difference between the first drive signal and the third drive signal. In other words, before the phase difference between the first drive signal and the third drive signal becomes 0, duration from a current moment to a moment at which the rising edge of the first drive signal is aligned with the rising edge of the third drive signal is subtracted at each rising edge of the first drive signal.

The change amount may be preset or may be obtained through calculation. Change amounts for all changes may be the same or may be different. For example, when the change amounts for all the changes are the same, the change amount may be referred to as a step. Assuming that the before-switching phase difference is 30 and that the step is 1, after 30 rising edges of the first drive signal, the phase difference between the first drive signal and the third drive signal may be decreased to 0. For another example, when the change amounts for all the changes are different, a relatively large change amount may be set at an early stage of gradually changing the phase difference between the first drive signal and the third drive signal, and when the phase difference between the first drive signal and the third drive signal approximates to 0, the change amount is reduced.

In addition, after the phase difference between the first drive signal and the third drive signal becomes 0, if the phase difference between the first drive signal and the third drive signal continues to be decreased, the phase difference between the first drive signal and the third drive signal becomes a negative value. In other words, it takes some time to align the rising edge of the third drive signal with the rising edge of the first drive signal. Therefore, one embodiment on of continuously decreasing the phase difference between the first drive signal and the third drive signal is: determining, at each rising edge of the third drive signal, whether an absolute value of the current phase difference between the first drive signal and the third drive signal is the before-switching phase difference. If the absolute value of the current phase difference between the first drive signal and the third drive signal is not the before-switching phase difference, a change amount is subtracted from the current phase difference between the first drive signal and the third drive signal, a phase difference obtained through subtracting the change amount is used as the current phase difference between the first drive signal and the third drive signal. In other words, before the absolute value of the phase difference between the first drive signal and the third drive signal is increased to the before-switching phase difference, duration from a current moment to a moment at which the rising edge of the third drive single is aligned with the rising edge of the first drive signal is added at each rising edge of the third drive signal.

The change amount is set in a same manner as described above. Details are not repeated herein. For example, if the before-switching phase difference is 30 and the change amount is 1, after the phase difference between the first drive signal and the third drive signal becomes 0, the phase difference between the first drive signal and the third drive signal may become the opposite number of the before-switching phase difference after 30 rising edges of the third drive signal.

Further, to make voltages at two ends of a load remain stable, a drive frequency is gradually changed in a process of gradually changing the phase difference between the first drive signal and the third drive signal, so that a product of the phase difference and the drive frequency falls within a target range.

For example, in one embodiment of gradually changing the phase difference between the first drive signal and the third drive signal, the drive frequency is gradually increased in a process of gradually decreasing the phase difference between the first drive signal and the third drive signal, so that a product of a decreased phase difference and an increased drive frequency falls within the target range. The drive frequency is gradually decreased in a process of continuously decreasing the phase difference between the first drive signal and the third drive signal after the phase difference between the first drive signal and the third drive signal becomes 0, so that a product of an absolute value of a decreased phase difference and a decreased drive frequency falls within the target range.

It should be noted that there is a dead time between the first drive signal and the second drive signal and that there is also a dead time between the third drive signal and the fourth drive signal. Therefore, in the process of changing the phase difference between the first drive signal and the third drive signal, the phase difference between the first drive signal and the third drive signal is unlikely to be 0. In other words, in the process of changing the phase difference between the first drive signal and the third drive signal, when the phase difference between the first drive signal and the third drive signal is decreased until approaching 0, the phase difference between the first drive signal and the third drive signal becomes a negative value if the phase difference between the first drive signal and the third drive signal continues to be decreased.

In the process of changing the phase difference between the first drive signal and the third drive signal, the absolute value of the phase difference between the first drive signal and the third drive signal is first decreased and then increased. In a process of decreasing the absolute value of the phase difference between the first drive signal and the third drive signal, the drive frequency is increased. In a process of increasing the absolute value of the phase difference between the first drive signal and the third drive signal, the drive frequency is decreased.

When the PSFB converter is connected to the load, because a voltage required by the load is usually within a given range, a voltage output by the input power supply by using the PSFB converter needs to be maintained within the given range. Assuming that the voltage of the input power supply is Vin, and that the voltage outputted by the input power supply by using the PSFB converter is $V_0$, a duty cycle of the PSFB converter may be expressed as $D=nV_0/Vin$, where n is a turn ratio of a primary turn to a secondary turn of the transformer. The duty cycle of the PSFB converter may alternatively be expressed as $D=phase \times f$, where phase is the phase difference between the first drive signal and the third drive signal, and f is the drive frequency. Therefore, if the voltages applied to the two ends of the load need to remain within a range, the duty cycle also needs to remain within a value range, and this value range is the target range.

According to operation 401 and operation 402, the first bridge arm can act as the leading bridge arm in one time period and act as the lagging bridge arm in another time period, and similarly, the second bridge arm can act as the lagging bridge arm in one time period and act as the leading bridge arm in another time period, so that a turn-off loss of the first bridge arm and a turn-off loss of the second bridge arm become almost the same, thereby improving reliability of the PSFB converter. Therefore, in one embodiment, before the PSFB converter is used, a lifespan of the PSFB converter may be estimated, and the first threshold and a second threshold of the timer are set based on the lifespan of the PSFB converter. For example, the first threshold and the second threshold each may be a half of the estimated lifespan. In this way, in an entire process of using the PSFB converter, the first bridge arm is the leading bridge arm and the second bridge arm is the lagging bridge arm for a half of usage time, and the first bridge arm is the lagging bridge arm and the second bridge arm is the leading bridge arm for another half of the usage time, so that the turn-off loss of the first bridge arm and the turn-off loss of the second bridge arm become almost the same.

If a specification of a MOSFET of the leading bridge arm is the same as that of a MOSFET of the lagging bridge arm, and a lifespan of the leading bridge arm is X and a lifespan of the lagging bridge arm is Y under a same usage condition, where X is less than Y. If a controller keeps controlling the first clock and the second clock to operate in the first state, a lifespan of the first bridge arm is X, and a lifespan of the second bridge arm is Y. In this case, the lifespan of the PSFB converter is X. However, if the controller controls the first clock and the second clock according to the method provided in this embodiment of this application, duration in which the first bridge arm acts as the leading bridge arm is almost the same as duration in which the second bridge arm acts as the leading bridge arm, and duration in which the first bridge arm acts as the lagging bridge arm is also almost the same as duration in which the second bridge arm acts as the lagging bridge arm. In this case, the lifespan of the first bridge arm is almost the same as the lifespan of the second bridge arm, both being $2XY/(X+Y)$. In this case, the lifespan of the PSFB converter is $2XY/(X+Y)$. X is less than Y, and therefore X is less than $2XY/(X+Y)$. It can be learned that the control method provided in embodiments of this application can improve the lifespan of the PSFB converter, thereby improving reliability of the PSFB converter.

For example, assume X is 800 hours and Y is 1200 hours. If the controller keeps controlling the first clock and the second clock to operate in the first state, the lifespan of the PSFB converter is 800 hours. However, according to the control method provided in embodiments of this application, the lifespan of the PSFB converter is 960 hours, thereby improving reliability of the PSFB converter.

In one embodiment of this application, the control circuit may further control the first clock and the second clock cycle to alternately operate in the first state and the second state, so as to improve reliability of the PSFB converter. In this case, after operation 402, the control circuit further may continue to implement control by performing the following operation 403.

Operation 403: The control circuit controls the timer to restart timing, and when new timing duration of the timer reaches a second threshold, the control circuit controls the first clock and the second clock to switch to the first state.

The first threshold and the second threshold may be the same or may be different. When the first threshold is the same as the second threshold, it indicates that when specified timing duration in the timer is the first threshold or the second threshold, the control circuit controls the first clock and the second clock to switch a working state each time the timing duration of the timer reaches the first threshold or the second threshold. This means that the leading bridge arm and the lagging bridge arm are switched each time the timing duration reaches the first threshold or the second threshold.

The first threshold or the second threshold may be randomly set, for example, both the first threshold and the second threshold may be 100 hours. Each time the timing duration reaches 100 hours, the control circuit controls the first clock and the second clock to switch from the first state to the second state, or controls the first clock and the second clock to switch from the second state to the first state.

When the first threshold is different from the second threshold, to make the turn-off loss of the first bridge arm and the turn-off loss of the second bridge arm become almost the same, a timing cycle of the timer may be: the first threshold, the second threshold, the second threshold, and the first threshold. In this case, when duration in which the controller controls the first clock and the second clock to operate in the first state reaches the first threshold, the controller controls the first clock and the second clock to switch to the second state, and when duration in which the controller controls the first clock and the second clock to operate in the second state reaches the second threshold, the controller controls the first clock and the second clock to switch to the first state. Subsequently, when duration in which the controller controls the first clock and the second clock to operate in the first state reaches the second threshold, the controller controls the first clock and the second clock to switch to the second state, and when duration in which the controller controls the first clock and the second clock to operate in the second state reaches the first threshold, the controller controls the first clock and the second clock to switch to the first state.

For example, assume the first threshold is 100 hours, and the second threshold is 50 hours. In this case, after having operated in the first state for 100 hours, the first clock and the second clock switch to the second state and operate in the second state for 50 hours, then switch to the first state and operate in the first state for 50 hours, and then switch to the second state and operate in the second state for 100 hours, so that the turn-off loss of the first bridge arm and the turn-off loss of the second bridge arm become almost the same.

In addition, for embodiments of controlling, by the control circuit, the first clock and the second clock to switch to the first state, refer to the embodiments of controlling, by the control circuit, the first clock and the second clock to switch to the second state in operation 402. Details are not repeated herein.

In this embodiment of this application, reliability of the PSFB converter is related to turn-off losses of the two bridge arms. To be specific, a greater difference between the two turn-off losses corresponding to the two bridge arms indicates lower reliability of the PSFB converter. In a working process of the PSFB converter, a turn-off loss of the leading bridge arm is greater than a turn-off loss of the lagging bridge arm. Therefore, in this application, after the control circuit of the PSFB converter controls the first clock and the second clock to operate in the first state for a time period, the control circuit controls the first clock and the second clock to switch to the second state. When the first clock and the second clock operate in the first state, the first bridge arm is the leading bridge arm, and the second bridge arm is the lagging bridge arm, and when the first clock and the second clock operate in the second state, the first bridge arm is the lagging bridge arm, and the second bridge arm is the leading bridge arm. Therefore, according to the control method provided in this application, the first bridge arm can act as the leading bridge arm in one time period and act as the lagging bridge arm in another time period, and similarly, the second bridge arm can act as the lagging bridge arm in one time period and act as the leading bridge arm in another time period, so that the turn-off loss of the first bridge arm and the turn-off loss of the second bridge arm become almost the same, thereby improving reliability of the PSFB converter.

The foregoing descriptions are merely the embodiments of this application, but are not intended to limit this application. Any modification, equivalent replacement, improvement, or the like made within the scope of this application shall fall within the protection scope of this application.

What is claimed is:

1. A method for controlling a phase-shifted full bridge (PSFB) converter, wherein the method comprises:
controlling, by a control circuit, a first clock and a second clock to operate in a first state, and controlling a timer to start counting a timing duration, wherein
the PSFB converter comprises a first bridge arm and a second bridge arm, wherein the first bridge arm comprises a first metal oxide semiconductor field effect transistor (MOSFET) and a second MOSFET, and the second bridge arm comprises a third MOSFET and a fourth MOSFET, wherein a first drive signal output by the control circuit based on the first clock is input to a gate of the first MOSFET, a second drive signal output by the control circuit based on the first clock is input to a gate of the second MOSFET, a third drive signal output by the control circuit based on the second clock is input to a gate of the third MOSFET, and a fourth drive signal output by the control circuit based on the second clock is input to a gate of the fourth MOSFET, wherein the first drive signal, the second drive signal, the third drive signal, and the fourth drive signal are all periodic signals, wherein frequencies of the first drive signal, the second drive signal, the third drive signal, and the fourth drive signal are the same and are drive frequencies, wherein the first drive signal and the second drive signal are complementary to each other, and the third drive signal and the fourth drive signal are complementary to each other, and wherein when the first clock and the second clock operate in the first state, the first bridge arm is a leading bridge arm, and the second bridge arm is a lagging bridge arm; and
controlling, by the control circuit when the timing duration of the timer reaches a first threshold, the first clock and the second clock to switch to a second state by gradually changing a phase difference between the first drive signal and the third drive signal over a plurality of periods of the first drive signal, including
setting the phase difference between the first drive signal and the third drive signal after the plurality of periods of the first drive signal to an opposite number of a before-switching phase difference, including
gradually changing the phase difference between the first drive signal and the third drive signal until the phase-difference between the first drive signal and the third drive signal is the opposite number of the before-switching phase difference,
wherein the before-switching phase difference is a phase difference between the first drive signal and the third drive signal when the first clock and the second clock operate the first state,
wherein when the first clock and the second clock operate in the second state, the first bridge arm is the lagging bridge arm, and the second bridge arm is the leading bridge arm.

2. The method according to claim 1, wherein the first bridge arm and the second bridge arm form a quadrilateral, the first MOSFET is at a first corner of the quadrilateral, the second MOSFET is at a second corner of the quadrilateral, the third MOSFET is at a third corner of the quadrilateral, and the fourth MOSFET is at a fourth corner of the quadrilateral, and wherein the first corner and the third corner are opposite to each other, and the second corner and the fourth corner are opposite to each other.

3. The method according to claim 1, further comprising:
gradually changing the drive frequencies while gradually changing the phase difference between the first drive signal and the third drive signal, so that a product of the phase difference and a change in the drive frequencies falls within a target range.

4. The method of claim 3, wherein when a magnitude of the phase difference between the first drive signal and the third drive signal decreases, the drive frequencies are increased, and wherein when a magnitude of the phase difference between the first drive signal and the third drive signal increases, the drive frequencies are decreased.

5. The method according to claim 1, wherein the controlling, by the control circuit, the first clock and the second clock to switch to the second state comprises controlling the timer to restart counting a second timing duration, and wherein the method further comprises:
controlling, by the control circuit when the second timing duration of the timer reaches a second threshold, the first clock and the second clock to switch to the first state.

6. The method of claim 5, further comprising:
controlling, by the control circuit, the first clock and the second clock to alternatively operate between the first state and the second state.

7. The method according claim 1, wherein the gradually changing the phase difference between the first drive signal and the third drive signal comprises changing the phase difference by a same amount for each change until the phase difference between the first drive signal and the third drive signal is the opposite number of the before-switching phase difference.

8. The method according to claim 1, wherein the gradually changing the phase difference between the first drive signal and the third drive signal comprises decreasing a magnitude of the phase difference for each change as the phase difference between the first drive signal and the third drive signal approaches 0.

9. A phase-shifted full bridge (PSFB) converter, wherein the PSFB converter comprises a first bridge arm, a second bridge arm, a power output circuit, and a control circuit, wherein
the first bridge arm and the second bridge arm are connected in parallel, the first bridge arm comprises a first metal oxide semiconductor field effect transistor (MOSFET) and a second MOSFET, and the second bridge arm comprises a third MOSFET and a fourth MOSFET, wherein a first input end of the power output circuit is connected to a bridge arm midpoint of the first bridge arm, and a second input end of the power output circuit is connected to a bridge arm midpoint of the second bridge arm,
wherein the control circuit comprises a first clock, a second clock, and a timer, wherein a first drive signal output by the control circuit based on the first clock is input to a gate of the first MOSFET, a second drive signal output by the control circuit based on the first clock is input to a gate of the second MOSFET, a third drive signal output by the control circuit based on the second clock is input to a gate of the third MOSFET, and a fourth drive signal output by the control circuit based on the second clock is input to a gate of the fourth MOSFET, wherein the first drive signal, the second drive signal, the third drive signal, and the fourth drive signal are all periodic signals, wherein frequencies of the first drive signal, the second drive signal, the third drive signal, and the fourth drive signal are the same and are drive frequencies, wherein the first drive signal and the second drive signal are complementary to each other, and the third drive signal and the fourth drive signal are complementary to each other, wherein the control circuit is configured to control the first clock and the second clock to operate in a first state, and to control the timer to start counting a timing duration, and wherein when the first clock and the second clock operate in the first state, the first bridge arm is a leading bridge arm, and the second bridge arm is a lagging bridge arm, and wherein the control circuit is further configured to control the first clock and the second clock to switch to a second state when the timing duration of the timer reaches a first threshold by being configured to gradually change a phase difference between the first drive signal and the third drive signal over a plurality of periods of the first drive signal, including setting the phase difference between the first drive signal and the third drive signal after the plurality of periods of the first drive signal to an opposite number of a before-switching phase difference, including gradually changing the phase difference between the first drive signal and the third drive signal until the phase difference between the first drive signal and the third drive signal is the opposite number of the before-switching phase difference, wherein the before-switching phase difference is a phase difference between the first drive signal and the third drive signal when the first clock and the second clock operate in the first state, wherein when the first clock and the second clock operate in the second state, the first bridge arm is the lagging bridge arm, and the second bridge arm is the leading bridge arm.

10. The PSFB converter according to claim 9, wherein the first bridge arm and the second bridge arm form a quadrilateral, the first MOSFET is at a first corner of the quadrilateral, the second MOSFET is at a second corner of the quadrilateral, the third MOSFET is at a third corner of the quadrilateral, and the fourth MOSFET is at a fourth corner of the quadrilateral, and wherein the first corner and the third corner are opposite to each other, and the second corner and the fourth corner are opposite to each other.

11. The PSFB converter according to claim 9, wherein the control circuit is further configured to gradually change the drive frequencies while gradually changing the phase difference between the first drive signal and the third drive signal, so that a product of the phase difference and a change in the drive frequencies falls within a target range.

12. The PSFB converter according to claim 11, wherein when the control circuit is configured to gradually change the drive frequencies while gradually changing the phase difference, the control circuit is further configured to increase the drive frequencies when the phase difference between the first drive signal and the third drive signal decreases, and to decrease the drive frequencies when the phase difference between the first drive signal and the third drive signal increases.

13. The PSFB converter according to claim 9, wherein when the control circuit is configured to control the first clock and the second clock to switch to the second state, the control circuit is further configured to control the timer to restart counting a second timing duration, and when the second timing duration of the timer reaches a second threshold, the control circuit is further configured to control the first clock and the second clock to switch to the first state.

14. The PSFB converter according to claim 13, wherein the control circuit is further configured to control the first clock and the second clock to alternatively operate between the first state and the second state.

15. The PSFB converter according to claim 9, wherein when the control circuit is configured to gradually change the phase difference between the first drive signal and the third drive signal, the control circuit is further configured to change the phase difference by a same amount for each change until the phase difference between the first drive signal and the third drive signal is the opposite number of the before-switching phase difference.

16. The PSFB converter according to claim 9, wherein when the control circuit is configured to gradually change the phase difference between the first drive signal and the third drive signal, the control circuit is further configured to decrease a magnitude of the phase difference for each change as the phase difference between the first drive signal and the third drive signal approaches 0.

* * * * *

UNITED STATES PATENT AND TRADEMARK OFFICE
CERTIFICATE OF CORRECTION

PATENT NO. : 10,784,786 B2
APPLICATION NO. : 16/426962
DATED : September 22, 2020
INVENTOR(S) : Juzheng Yu Page 1 of 1

It is certified that error appears in the above-identified patent and that said Letters Patent is hereby corrected as shown below:

In the Claims

In Claim 1, Column 15, Line 50, delete "phase-difference" and insert --phase difference--.

In Claim 1, Column 15, Line 56, delete "operate the first state." and insert --operate in the first state.--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*